(12) United States Patent
Said (10) Patent No.: US 7,874,514 B2
(45) Date of Patent: Jan. 25, 2011

(54) AMPHIBIOUS AIRCRAFT

(75) Inventor: Brian R. Said, Jupiter, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 362 days.

(21) Appl. No.: 11/758,404

(22) Filed: Jun. 5, 2007

(65) Prior Publication Data

US 2008/0001025 A1 Jan. 3, 2008

Related U.S. Application Data

(60) Provisional application No. 60/803,905, filed on Jun. 5, 2006.

(51) Int. Cl.
B64C 3/00 (2006.01)
B64C 3/38 (2006.01)
B64C 5/16 (2006.01)
B64C 25/54 (2006.01)

(52) U.S. Cl. .................. 244/39; 244/45 A; 244/48; 244/101; 244/105; 114/273; 440/37

(58) Field of Classification Search ................ 244/101, 244/105, 106, 108, 2, 50, 45 R, 45 A, 39, 244/48, 7 C, 38, 13; 114/272, 273, 274, 114/283, 292; 480/37; 180/116, 117, 118
See application file for complete search history.

(56) References Cited

U.S. PATENT DOCUMENTS

| 1,857,347 | A | * | 5/1932 | Beebe | 114/272 |
| 1,890,113 | A | * | 12/1932 | Hitt | 114/273 |
| D112,834 | S | * | 1/1939 | de Seversky | 244/45 R |
| 3,159,361 | A | * | 12/1964 | Weiland | 244/106 |
| 3,221,831 | A | * | 12/1965 | Weiland | 180/117 |
| 3,244,246 | A | * | 4/1966 | Weiland | 180/116 |
| 4,387,866 | A | * | 6/1983 | Eickmann | 244/7 C |
| 5,145,129 | A | * | 9/1992 | Gebhard | 244/45 A |
| 5,758,844 | A | * | 6/1998 | Cummings | 244/7 C |
| 5,863,013 | A | * | 1/1999 | Schmittle | 244/48 |
| 6,089,503 | A | * | 7/2000 | Volk | 244/48 |
| 2006/0016931 | A1 | * | 1/2006 | Malvestuto et al. | 244/45 R |

* cited by examiner

Primary Examiner—Tien Dinh
Assistant Examiner—Richard R Green
(74) Attorney, Agent, or Firm—DeMont & Breyer, LLC (57) ABSTRACT

A multi-wing, multi-engine, multi-hull amphibious aircraft is disclosed. In the illustrative embodiment, the aircraft has an open frame structure without a fuselage.

16 Claims, 10 Drawing Sheets

AMPHIBIOUS AIRCRAFT

CROSS REFERENCE TO RELATED APPLICATIONS

This case claims priority of U.S. Provisional Patent Application 60/803905, filed on Jun. 5, 2006 and incorporated by reference herein.

FIELD OF THE INVENTION

The present invention relates to seaplanes.

BACKGROUND OF THE INVENTION

Water take-off and landing of amphibious aircraft depends on the planing performance of support floats (for a float plane) or the main fuselage (for a flying boat).

By definition, planing situates the aircraft atop the sea-way. In this position, the aircraft is subject to the motions of either following atop or "skipping" over the undulating wave surface. This often results in an unstable surface dynamic response, such as "porpoising" motion and even premature ballistic launch off of wave crests. These behaviors can result in near-surface stalls and crashes.

As a consequence, active pilot control and a calm sea-surface environment is required for water take-off and landing. And even with pilot control, take-off and landing is limited to sea states of no more than a few feet (i.e., SS1 or SS2) with conventional present day amphibious aircraft. Autonomous take-off and landing, such as would be required for an unmanned amphibious vehicle, is, for all practical purposes, impossible with present technology.

SUMMARY OF THE INVENTION

The present invention provides a way to remotely launch and recover unmanned amphibious vehicles, even in high sea states.

The illustrative embodiment of the present invention is a multi-wing, multi-engine, multi-hull amphibious aircraft. In the illustrative embodiment, the aircraft has an open frame structure; that is, there is no fuselage. Embodiments of the aircraft include some or all of the following features:
  a canard wing;
  high thrust-to-weight ratio power-plants with optional vectoring "free wing" sections;
  segmented wing having separately positionable outer and inner segments, thereby providing morphing/moveable wing forms;
  semi-submersible wave piercing semi-planing hull forms (catamaran or trimaran style amas);
  semi-submersible hulls that pivot independently of the wings and engines;
  hydrofoil struts (akas);
  UUV transport cradles/structures;
  a personnel pod; and
  a folding structure for stowage.

As described further below, these features provide an amphibious aircraft that has excellent heavy-lift capability (i.e., pounds carried per horsepower), extreme sea state sea-keeping abilities, aeronautic handling stability (i.e., stall resistance), and extensive payload handling space due to the open frame structure (i.e., no fuselage).

A canard wing craft is inherently stall resistant. The stall resistance is due to the fact that the canard (forward) wing is designed to stall before the main (aft) wing. This causes the aircraft to pitch down gently, thereby enabling the craft to recover speed, preventing the main wing from stalling.

In the illustrative embodiment, the longitudinal spacing of nearly equal wing loads creates a very pitch-stable aircraft, which is a significant stabilizing feature for robotic/autonomous flight control. Also, the longitudinal spacing of nearly equal wing loads provides a craft that has a large tolerance to shifts in payload center-of-gravity of the payload, which is another stabilizing feature.

The wing plan of the illustrative embodiment accommodates and, in fact, forms part of the aircraft's "frame," which is a box-kite-like structure defined by the multiple hulls, support struts (and the wings). This advantageously connects the multiple hulls with the wings in a geometry that is conducive to rotating mid-wing/engine sections that can produce vectored thrust. In some embodiments, the outboard wing sections have morphing ability to span from STOL (i.e., "short take off and landing") to cruise-camber cross sections.

The strut-supported structural airframe accommodates the morphing wing forms. Further, modular interfaces between wings and airframe facilitate fold, swing and morphing modalities. It is the 'swing wing' mode that is particularly well suited to daunting high sea-state amphibious take-offs and landings. In some embodiments, the independent pitch orientation of the wing preserves unbroken streamlines (i.e., 'non-stalled lifting performance') through any and all pitch angles of the multi-hull sea-frame hulls below, so long as air velocity is maintained over the wings.

The use of tandem engines enables simplified pitch control during vector thrust maneuvers as well as redundant flight power during conventional forward flight.

Wave-piercing multi-hull "amas" provide semi-submersible hulls that drastically reduce the tendency for ballistic launch of the air craft off the crest of a wave since they are not fully planing devices. Rather, they gradually rise through the air/ocean interface as more lift is shared with the wings/thrust system. In other words, the aircraft achieves take-off velocity without the hulls coming onto full plane atop the sea surface. This enables safe take-off and landing with relatively greater independence from sea surface state than prior-art amphibious craft.

The use of hydrofoil "akas" fore and aft on the amas provides lift when the amas are submerged.

Applications for the amphibious aircraft disclosed herein include, without limitation:
  portable over-the-horizon connectivity of UUV/SOF missions in the littoral regions, including versions of scale comparable to and larger than the C-130 Hercules heavy lift aircraft;
  portable long duration, geo-stationary deployment for line-of-sight communications and ISR (intelligence/surveillance/reconnaissance) relay in scale modified sizes down to man carry and hand launchable;
  portable over-the-horizon connectivity for inter-active re-supply to real-time missions in progress; and
  portable over-the-horizon medical evacuation.

DETAILED DESCRIPTION

Figure 1:
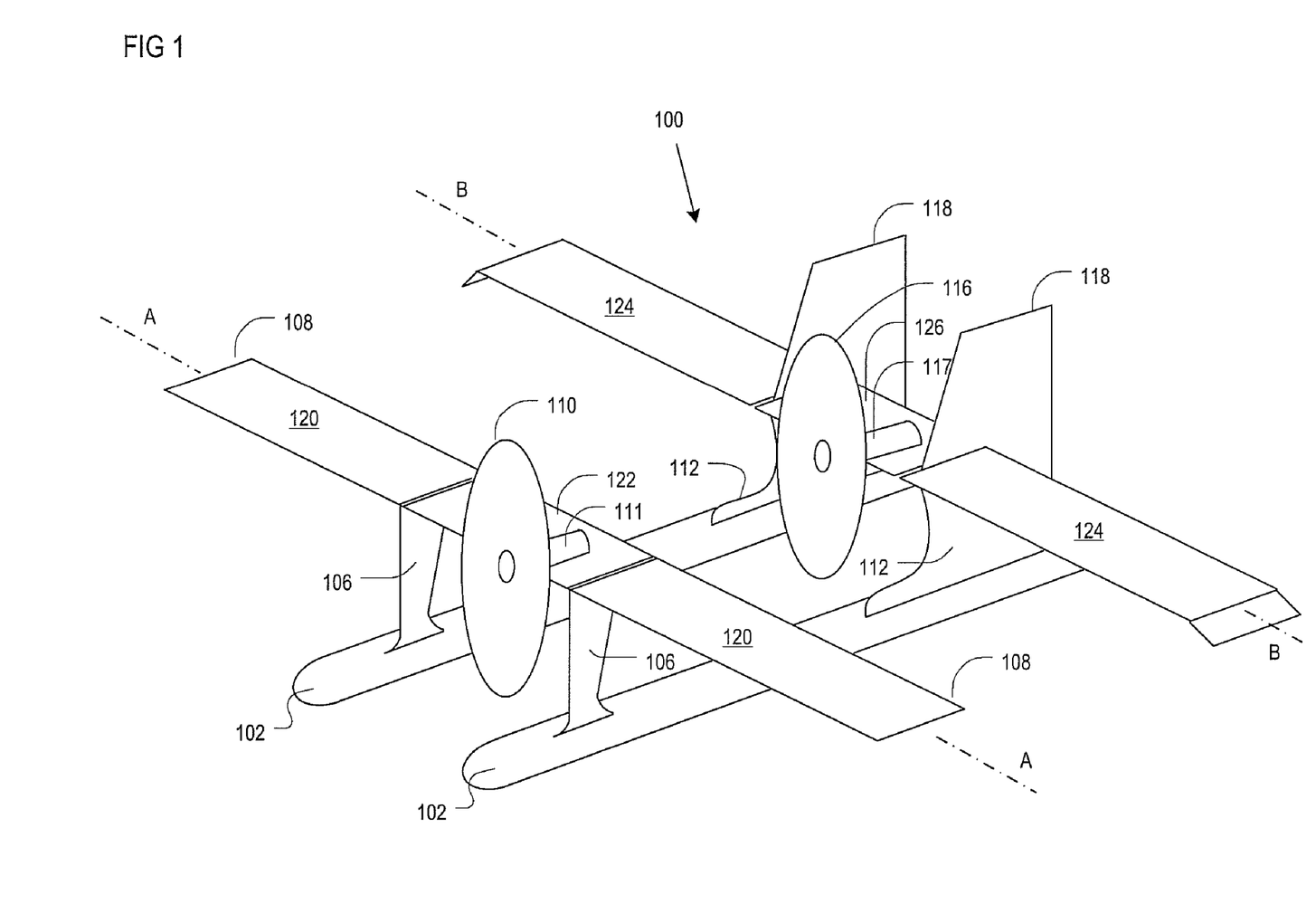
FIG. 1 depicts a perspective view of an amphibious aircraft in accordance with the illustrative embodiment of the invention.
Figure 2:
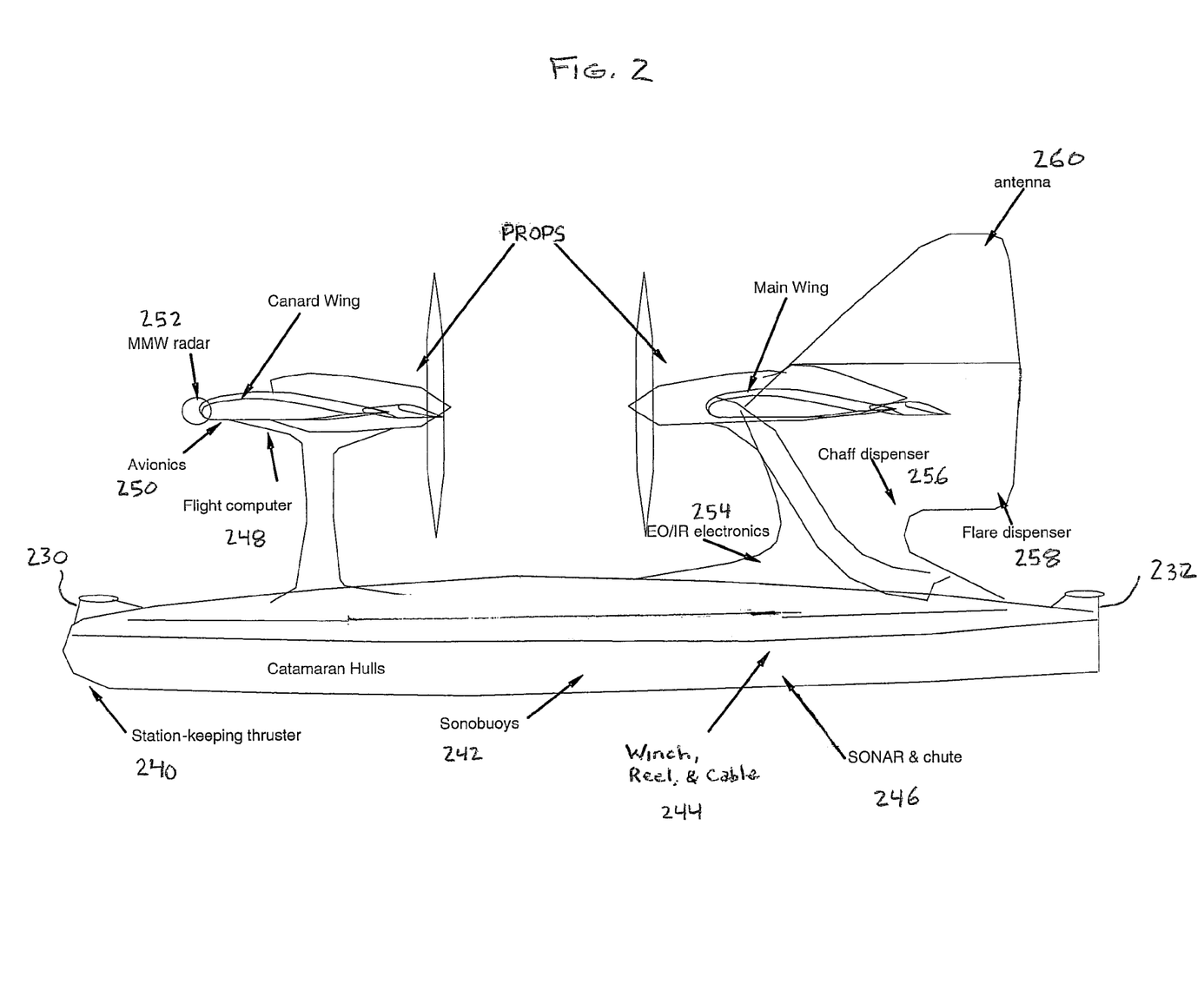
FIG. 2 depicts a side view of an amphibious aircraft in accordance with the illustrative embodiment of the invention.
Figure 3:
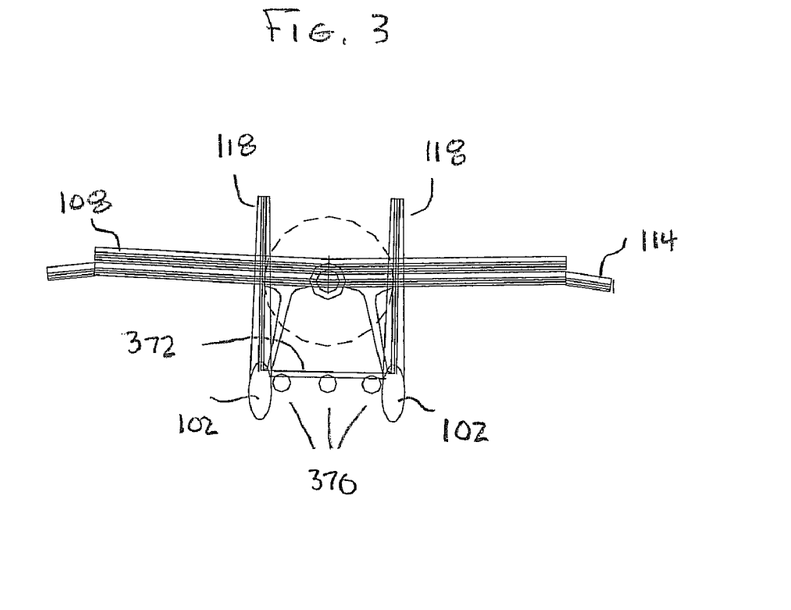
FIG. 3 depicts a top view of an amphibious aircraft in accordance with the illustrative embodiment of the invention.
Figure 4:
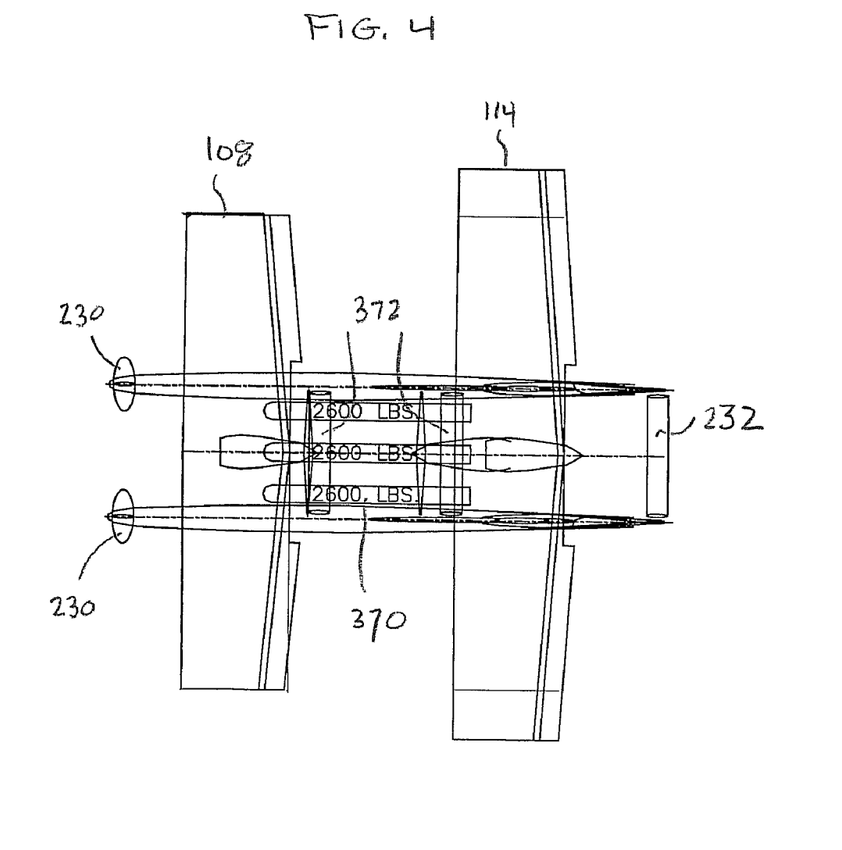
FIG. 4 depicts a front view of an amphibious aircraft in accordance with the illustrative embodiment of the invention.

FIGS. 1-4 depict various views of amphibious aircraft 100 in accordance with the illustrative embodiment of the invention. In particular, FIG. 1 depicts a perspective view, FIG. 2 depicts a side view, FIG. 3 depicts front view, and FIG. 4 depicts a top view.

Referring now to FIGS. 1-4, amphibious aircraft 100 comprises hulls 102, canard wing support struts 106, canard wing 108, canard wing prop 110, canard wing engine 111, main wing support struts 112, main wing 114, main wing prop 116, main wing engine 117, and tail 118, interrelated as shown.

Figure 5A:
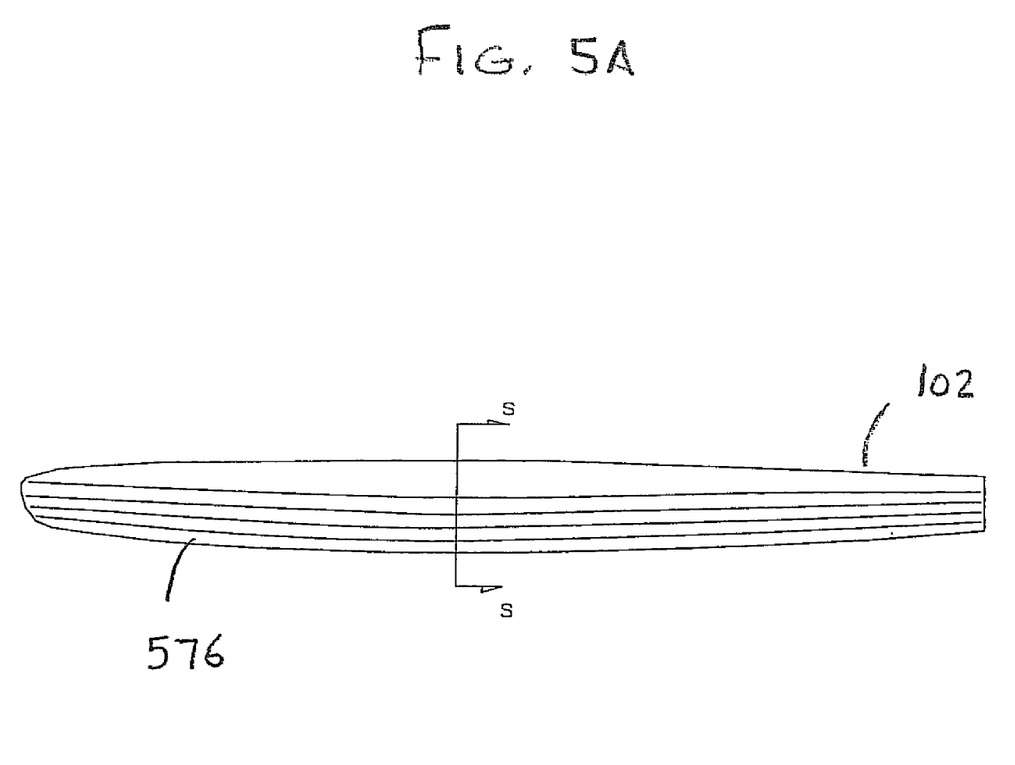
FIGS. 5A and 5B depict respective side and cross-sectional views of a wave-piercing semi-submersible hull for use in conjunction with the amphibious aircraft.
Figure 5B:
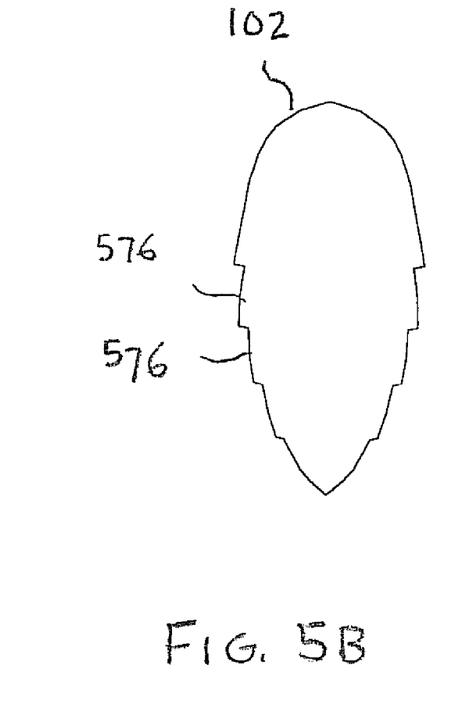

In the illustrative embodiment, hulls 102 are semi-submersible, wave-piercing, catamaran "amas." Referring to FIGS. 5A (side view) and 5B (cross section thru s-s), hulls 102 have ledges or "strakes" 576 that provide lifting/planing regions below the waterline.

Figure 6:
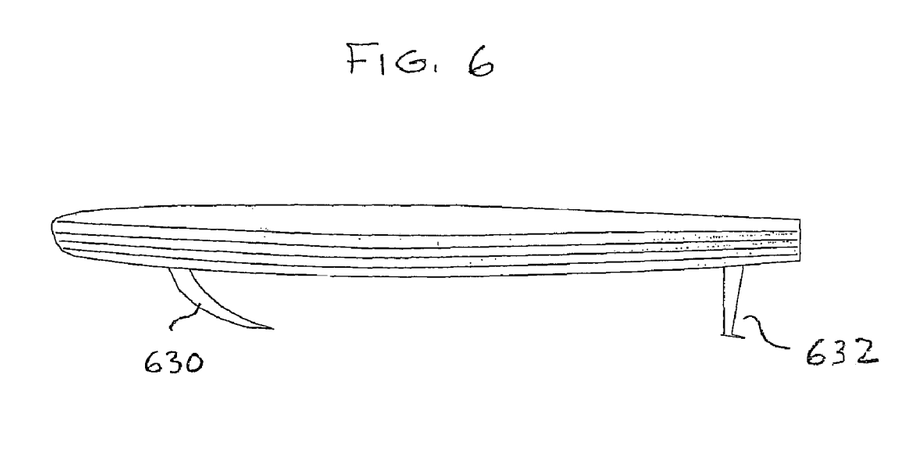
FIG. 6 depicts a side view of a wave-piercing semi-submersible hull that incorporates hydrofoil wing sections to provide dynamic lift below the waterline.

In the embodiment that is depicted in FIGS. 2 and 4, hydrofoil "akas" 230 and 232 depend from respective fore and aft regions of the top of each hull 102. In an alternative embodiment depicted in FIG. 6, hydrofoils akas 630 and 632 depend from respective fore and aft regions on the bottom of each hull 102.

With continued reference to FIGS. 1-4, in FIG. 1, props 110 and 116 are both disposed in front of the associated wing. FIGS. 2 and 4 show an alternative embodiment of aircraft 100, wherein prop 110 is disposed aft of canard wing 108 and prop 116 is disposed forward of main wing 116. In other words, props 110 and 116 face each other. Thrust configurations are described further later in this specification in conjunction with FIGS. 8A-8C and 10.

Canard wing 108 is supported by two struts 106 that, in the illustrative embodiment, depend from a forward region of the upper surface of hulls 102. In some embodiments, canard wing 108 is movably coupled to struts 106 so that wing 108 is free to rotate about axis A-A. In the embodiment that is depicted in FIG. 1, axis A-A is depicted as falling along the centerline of wing 108. The actual location of this axis of rotation is a function of aerodynamic considerations and desired capabilities. In conjunction with this disclosure, it is within the capabilities of those skilled in the art to determine the position of this rotational axis.

Main wing 114 is supported by two struts 112 that, in the illustrative embodiment, depend from an aft region of the upper surface of hulls 102. In some embodiments, main wing 114 is movably coupled to struts 112 so that wing 114 is free to rotate about axis B-B. As indicated with respect to canard wing 108, the depicted location of axis A-A is merely for illustrative purposes; its actual position is determined as a function of aerodynamic considerations and craft capabilities. The term "pitchable" is used herein to refer to the aforedescribed movement of wings 108 and 114.

In some embodiments, such as the embodiment depicted in FIG. 1, canard wing 108 and/or main wing 114 are segmented. For example, canard wing 106 comprises outer segments 120 and inner segment 122. Likewise, main wing 114 has outer segments 124 and inner segment 126. The segmented structure facilitates independent movement of the inner and outer segments of each wing. In other words, inner segment 122 of canard wing 108 is movable independently of outer segments 120. In various embodiments:

The inner segment is independently movable and the outer segments are fixed;

The inner segment is independently movable and the outer segments are collectively movable;

The inner segment is independently movable and the outer segments are movable independently of each other;

The inner segment is fixed and the outer segments are collectively movable; and

The inner segment is fixed and the outer segments are movable independently of each other.

This capability is described in further detail later in this specification in conjunction with FIGS. 9A-9B. 11A-11C, 12A-12C.

Any of a variety of mechanical arrangements can be used to provide the requisite degree of freedom to wings 108 and/or 114 and to the various wing segments. In conjunction with the present disclosure, those skilled in the art will be able to couple the wings to the struts in such a way that the wings are movable relative to the struts, or, as appropriate wing segments are independently movable.

The embodiment of aircraft 102 that is depicted in FIG. 2 includes a number of auxiliary sub-systems, many of which are intended for use in military and/or rescue applications. These include: station-keeping thruster 240, sonobuoys 242, winch, reel & cable 244, sonar & chute 246, flight computer 248, avionics 250, MMW radar 252, EO/IR electronics 254, chaff dispenser 256, flare dispenser 258, and antenna 260. The design and use of these devices and systems are known to those skilled in the art.

FIGS. 3 and 4 depict aircraft 100 carrying UUVs 370 (unmanned underwater vehicles). These UUVs are coupled to crossbeams 372. Aircraft 100 provides a means for launching UUVs 370 directly into a desired theater of operation. This is advantageous because, due to size and weight limitations, UUVs typically carry relatively few batteries on board. Since these batteries must power the UUV drive system, UUVs typically have a relatively limited range. Aircraft 100, with its ability to take-off and land in high sea states, can sortie from a ship, fly to a remote location, land in high sea states, launch UUVs 370, then take-off and return to its mother ship. This can significantly extend the period of time that the UUV can operate, since battery power is not used to transport the UUV to its theater of operation.

Figure 7:
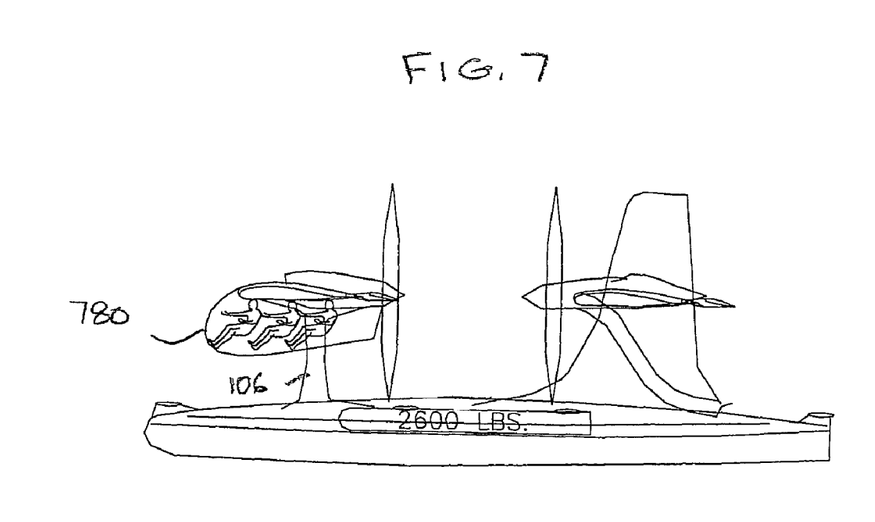
FIG. 7 depicts a personal pod for use in conjunction with the amphibious aircraft disclosed herein.

The open frame structure of aircraft 100 enables it to accommodate various payloads. In some embodiments, such as the embodiment depicted in FIG. 7, aircraft 100 includes personnel pod 780. In this embodiment, the pod is suspended from canard wing 108 between struts 106.

Figure 8A:
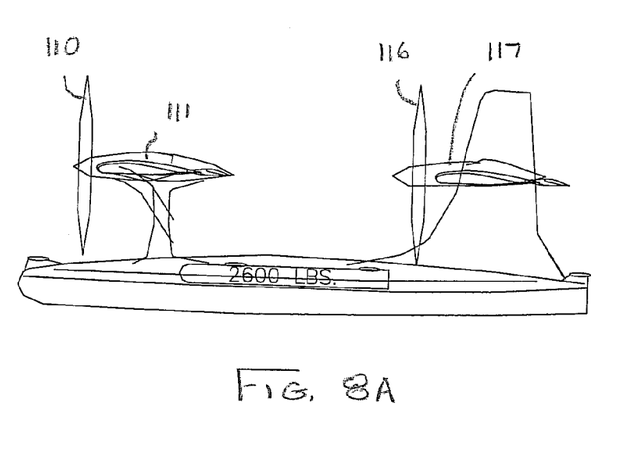
FIGS. 8A-8C depict several thrust/lift configurations for the engines/wings of the amphibious aircraft disclosed herein.
Figure 8B:
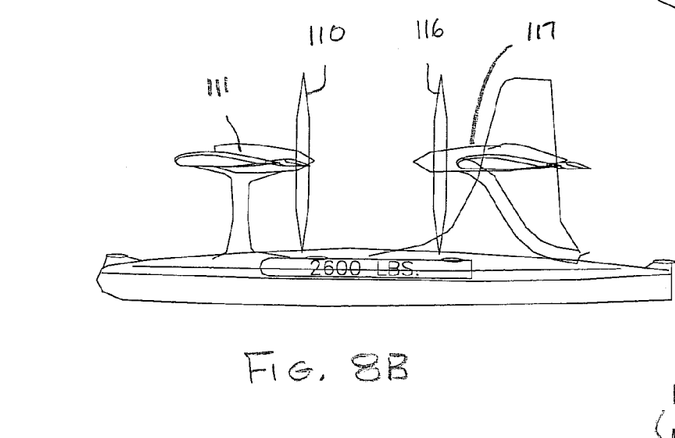
Figure 8C:
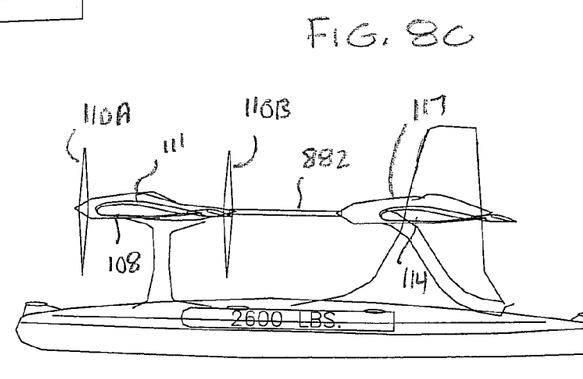

FIGS. 8A through 8C provide several thrust configurations for aircraft 100. The thrust configuration depicted in FIG. 8A includes two engines 11 and 117 driving respective propellers 110 and 116 that are situated forward of the associated wing and disposed one behind the other along the centerline of aircraft 100. This thrust configuration is also illustrated in FIG. 1.

FIG. 8B shows an alternative thrust configuration that includes two engines 111 and 117 driving respective propellers 110 and 116 that are disposed one behind the other along the centerline of aircraft 100. In this embodiment, prop 110 is disposed aft of the canard wing and prop 116 is disposed forward of the main wing. This thrust configuration is also illustrated in FIGS. 2 and 4.

FIG. 8C shows a further alternative thrust configuration wherein the two props 110A and 110B are associated with canard wing 108, wherein prop 110A is forward of that wing and prop 110B is aft. Engines 111 and 117 are connected by common longitudinal propeller shaft 882, permitting both of the engines to drive both propellers.

Figure 9A:
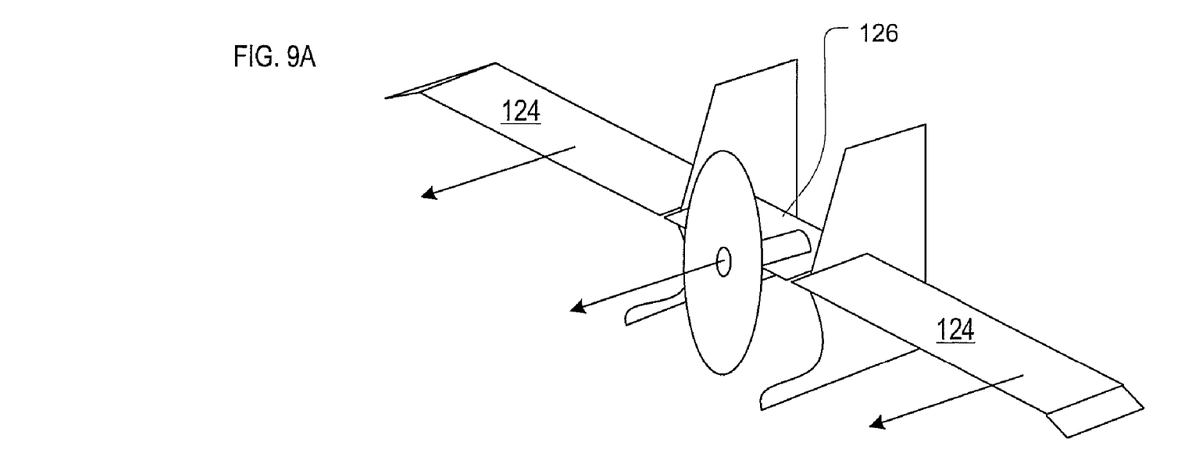
FIGS. 9A and 9B depict segmented wings for use in conjunction with the amphibious aircraft disclosed herein.
Figure 9B:
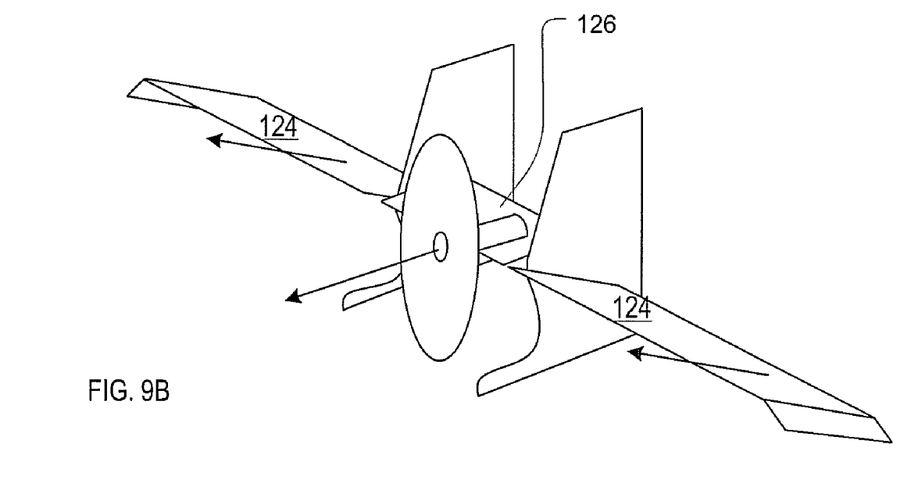

FIGS. 9A and 9B provide further illustration of the use of a segmented wing. These figures depict main wing 114, which is segregated into outer segments 124 and inner segment 126. In FIG. 9A, segments 124 and 126 are co-planar and horizontal. FIG. 9B depicts wing 114 when outer segments 124 are rotated so that the leading edge of the wing is raised, while the inner segment remains horizontal.

Figure 10:
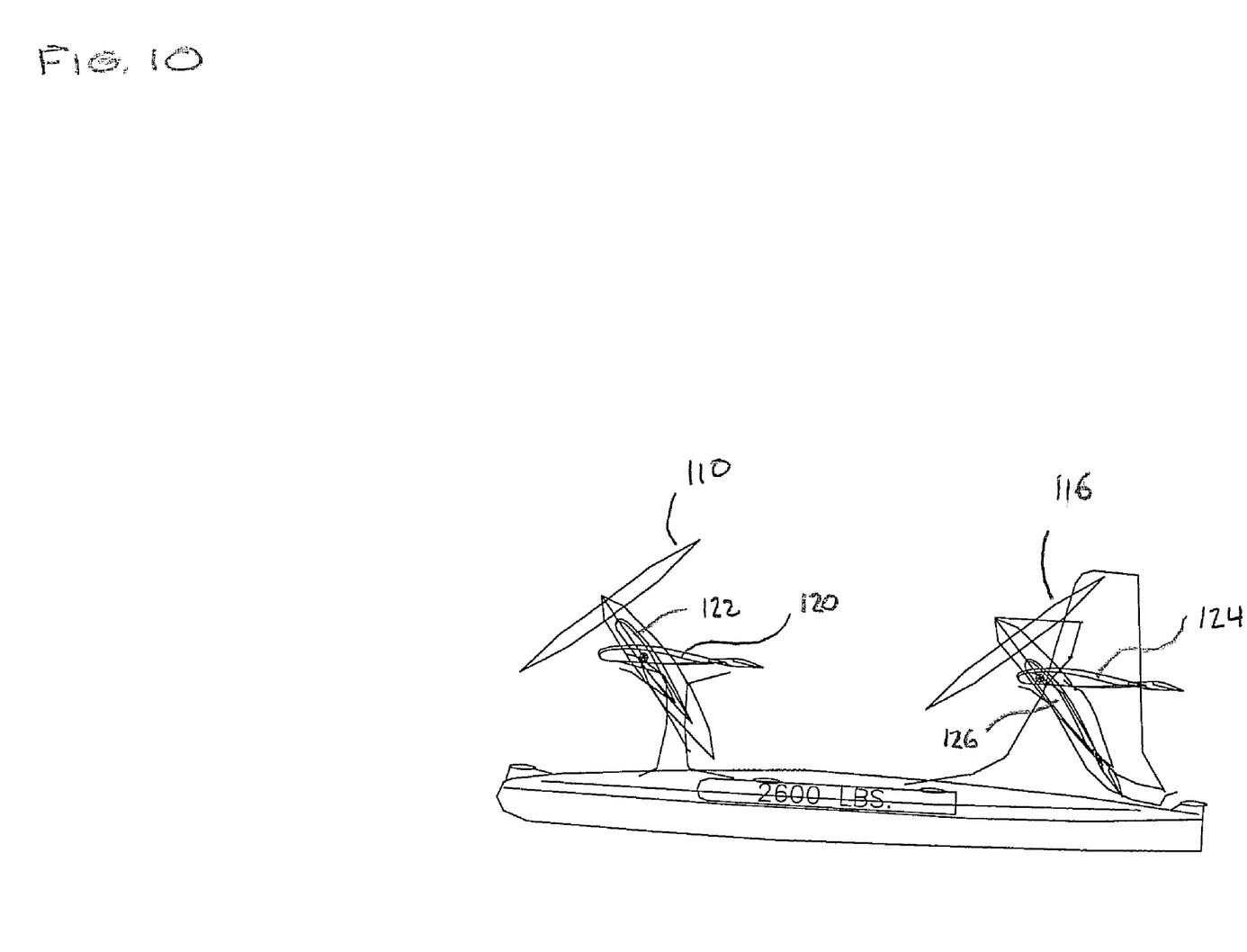
FIG. 10 depicts a vectored thrust capability for use in conjunction with the amphibious aircraft disclosed herein.

FIG. 10 depicts an embodiment wherein at least the inner segments 122 and 126 of respective wings 108 and 114 are pitchable to provide vectored thrust. In other words, props 110 and/or 114 are pitchable. Among any other benefits, this provides aircraft 100 with a vertical takeoff and landing capability.

Figure 11A:
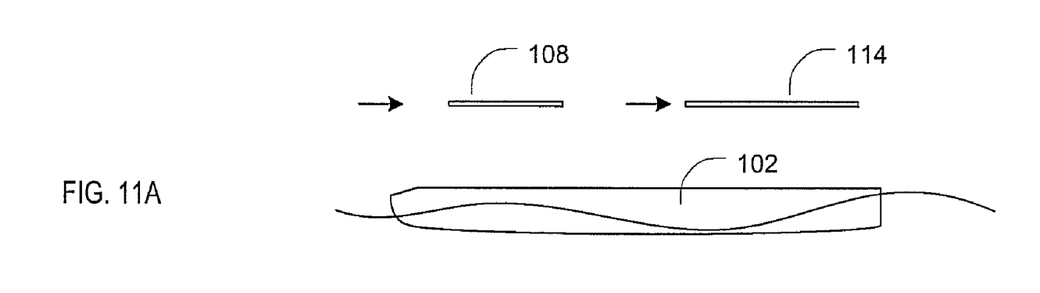
FIGS. 11A-11C depict a manner in which a vectored thrust capability is used to accommodate changes in air flow over the wings as a function of wave motion.
Figure 11B:
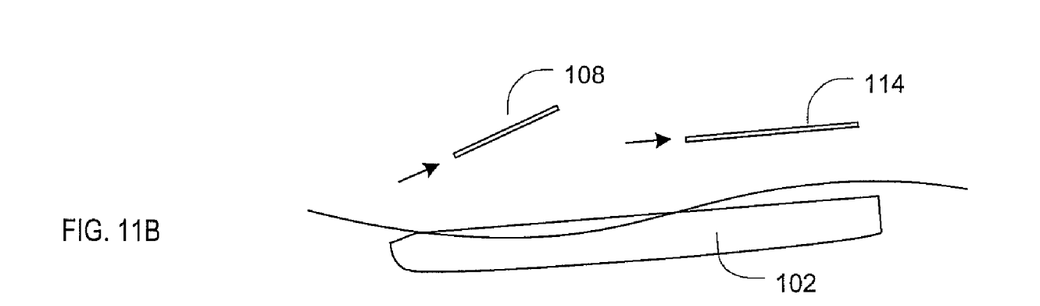
Figure 11C:
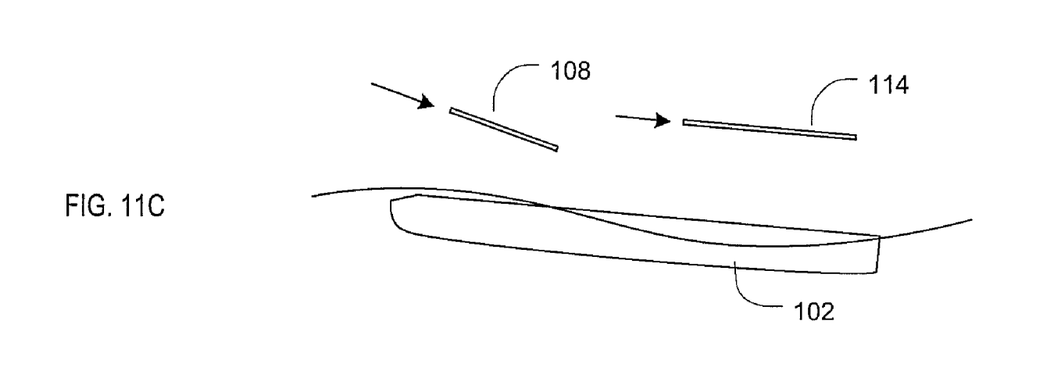

FIGS. 11A-11C provide further disclosure concerning the ability and benefits of being able to pitch at least canard wing 108. In these figures, only the wings and hulls are depicted for clarity. In the depictions that follow, those skilled in the art will recognize that moving the canard wing in the manner described will aid in stall prevention.

FIG. 11A depicts aircraft 100 in calm water, with short-wavelength swells. Semi-submersible hulls 102 maintain aircraft 100 in a relatively level attitude, such that horizontal incidental air streamlines are preserved.

FIG. 11B depicts aircraft 100 in rough water, with relatively longer-wavelength swells. This figure depicts aircraft 100 riding down a lowering sea swell, and depicts rising air streamlines. The leading edge of canard wing 108 is pitched "downward" to accommodate for the angle of these streamlines to maintain a "horizontal" or flat-planar relationship between the streamlines and canard wing 108

FIG. 11C depicts aircraft 100 in rough water, with relatively longer-wavelength swells. This figure depicts aircraft 100 riding up the rising sea swell, and depicts descending air streamlines. The leading edge of canard wing 108 is pitched "upward" to accommodate for the angle of these streamlines to maintain a "horizontal" or flat-planar relationship between the streamlines and canard wing 108.

In some embodiments, hulls 102 are independently movable (i.e., pitchable) relative to wings 108 and 114. This can serve some of the same purposes as enabling the wings to pitch. In particular, it can maintain a desirable relationship between air streamlines and the wings for stall prevention.

Figure 12A:
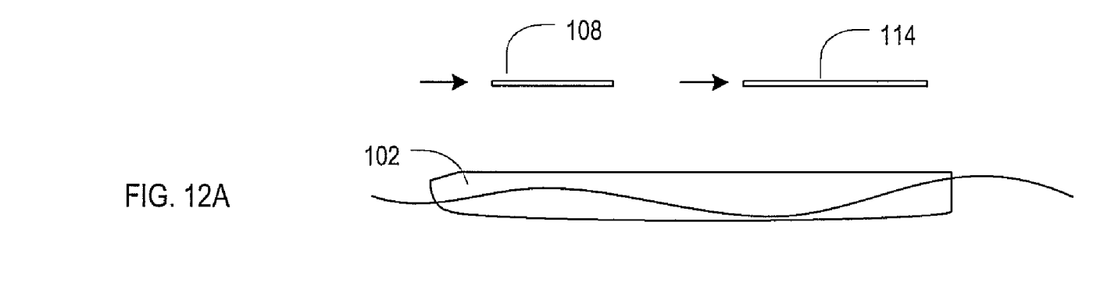
FIGS. 12A-12C depict pivoting semi-submersible hulls that are movable independently of the wings as a function of wave motion to maintain a desired air flow over the wings.
Figure 12B:
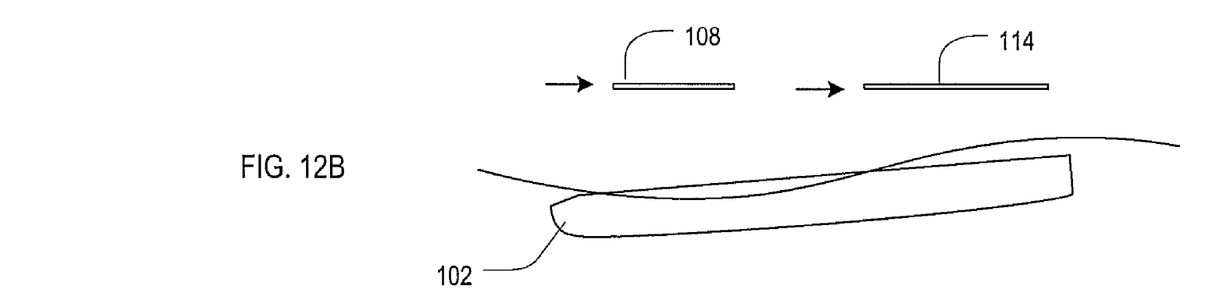
Figure 12C:
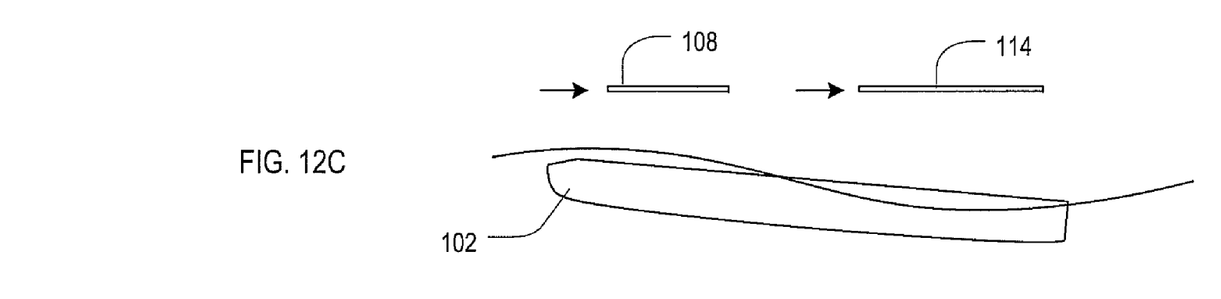

FIGS. 12A-12C depict aircraft 100 (again illustrated as simply a hull and wings) with pitchable hulls 102.

FIG. 12A depicts aircraft 100 in calm water, with short-wavelength swells. Semi-submersible hulls 102 maintain aircraft 100 in a relatively level attitude, such that horizontal incidental air streamlines are preserved.

FIG. 12B depicts aircraft 100 in rough water, with relatively longer-wavelength swells. This figure depicts aircraft 100 riding down a lowering sea swell. Hulls 102 are free to rotate downward relative to wings 108 and 114 so that the wings remain level.

FIG. 12C depicts aircraft 100 in rough water, with relatively longer-wavelength swells. This figure depicts aircraft 100 riding up a rising sea swell. Hulls 102 are free to rotate upward relative to wings 108 and 114 so that the wings remain level.

Any of a variety of mechanical arrangements can be used to provide the requisite degree of freedom to hulls 102. For example, in some embodiments, struts 106 and/or 112 can be appropriately hinged to hulls 102. In conjunction with the present disclosure, those skilled in the art will be able to couple the hulls and struts such that hulls are movable independently of the struts/wings. The term "pitchable" is used herein to refer to the aforedescribed movement of hulls 102, as well as to describe the movement of wings 108 and 114.

It is to be understood that the disclosure teaches only several alternatives of the illustrative embodiments and that many variations of the invention can easily be devised by those skilled in the art after reading this disclosure and that the scope of the present invention is to be determined by the following claims.

What is claimed is:

1. An amphibious aircraft comprising:
first and second semi-submersible hulls;
a canard wing coupled to the hulls via a first pair of struts, wherein the canard wing is pitchable with respect to the first pair of struts via rotation of the canard wing about an axis running from wingtip to wingtip thereof;
a main wing spaced apart from the canard wing and coupled to the hulls via a second pair of struts; and
a first engine
wherein the canard wing is segmented into outer segments and an inner segment, and wherein the outer segments are pitchable independently of the inner segment.

2. The amphibious aircraft of claim 1 wherein the first engine provides vectored thrust.

3. The amphibious aircraft of claim 1 wherein the main wing is pitchable with respect to the second pair of struts via rotation of the main wing about an axis running from wingtip to wingtip thereof.

4. The amphibious aircraft of claim 1 wherein the canard wing is segmented into outer segments and an inner segment, and wherein the inner segment is pitchable independently of the outer segments.

5. The amphibious aircraft of claim 1 wherein the hulls are pitchable with respect to the canard wing and the main wing.

6. The amphibious aircraft of claim 1 wherein the hulls comprise a surface augmentation below a waterline, wherein the surface augmentation comprises strakes.

7. The amphibious aircraft of claim 1 wherein the hulls comprise a hydrofoil.

8. The amphibious aircraft of claim 1 further comprising a personnel pod for carrying human occupants, wherein the personnel pod is disposed between the first pair of struts.

9. The amphibious aircraft of claim 1 wherein the first engine is coupled to the canard wing.

10. The amphibious aircraft of claim 9 comprising a second engine that is coupled to the main wing, wherein the first engine and the second engine are spaced apart along a centerline of the amphibious aircraft.

11. The amphibious aircraft of claim 10 wherein the first engine and the second engine each drive separate propellers and provide vectored thrust.

12. The amphibious aircraft of claim 10 wherein the propeller driven by the first engine is disposed forward of the canard wing.

13. The amphibious aircraft of claim 10 wherein the propeller driven by said second engine is disposed forward of the main wing.

14. The amphibious aircraft of claim 1 wherein the first and second hulls, the first pair of struts, the second pair of struts, the canard wing, and the main wing collectively define a frame of the amphibious aircraft.

15. An amphibious aircraft comprising:
first and second semi-submersible hulls;
a canard wing coupled to the hulls via a first pair of struts;
a main wing spaced apart from the canard wing and coupled to the hulls via a second pair of struts, wherein the first and second semi-submersible hulls are pitchable with respect to the canard wing and the main wing; and
a first engine coupled to one of the canard wing or the main wing.

wherein the main wing is pitchable with respect to the second pair of struts;
wherein the main wing is segmented into outer segments and an inner segment, and wherein the outer segments are pitchable independently of the inner segment.

16. An amphibious aircraft comprising:
first and second semi-submersible hulls;
a canard wing coupled to the hulls via a first pair of struts;
a main wing spaced apart from the canard wing and coupled to the hulls via a second pair of struts; and
a first engine coupled to one of the canard wing or the main wing; and
wherein at least one of either the canard wing or the main wing is physically adapted to pivot with respect to the respective first or second pair of struts in order to compensate for changes induced by wave motion in the incident angle of air flow over at least the canard wing,
wherein said at least one of either the canard wing or the main wing is segmented into outer segments and an inner segments, and wherein the outer segments are pitchable independently of the inner segment.

\* \* \* \* \*